United States Patent
Matsumoto et al.

(10) Patent No.: US 10,908,174 B2
(45) Date of Patent: Feb. 2, 2021

(54) AUTOMATIC ANALYZING APPARATUS

(71) Applicant: Toshiba Medical Systems Corporation, Otawara (JP)

(72) Inventors: Satoshi Matsumoto, Nasushiobara (JP); Tomohiro Sugimura, Otawara (JP); Masaaki Iwasaki, Yaita (JP); Takashi Goto, Otawara (JP); Arika Kato, Otawara (JP)

(73) Assignee: Canon Medical Systems Corporation, Otawara (JP)

( * ) Notice: Subject to any disclaimer, the term of this patent is extended or adjusted under 35 U.S.C. 154(b) by 255 days.

(21) Appl. No.: 15/705,891

(22) Filed: Sep. 15, 2017

(65) Prior Publication Data
US 2018/0080950 A1  Mar. 22, 2018

(30) Foreign Application Priority Data

Sep. 16, 2016  (JP) .................................. 2016-181546
Sep. 13, 2017  (JP) .................................. 2017-175565

(51) Int. Cl.
| G01N 35/10 | (2006.01) |
| G01N 35/02 | (2006.01) |
| G01N 35/04 | (2006.01) |
| G01N 35/00 | (2006.01) |
| G01N 21/82 | (2006.01) |
| G01N 21/78 | (2006.01) |

(52) U.S. Cl.
CPC ... G01N 35/1002 (2013.01); G01N 35/00732 (2013.01); G01N 35/025 (2013.01); *G01N 21/78* (2013.01); *G01N 21/82* (2013.01); *G01N 35/00693* (2013.01); *G01N 2035/0443* (2013.01); *G01N 2035/0444* (2013.01)

(58) Field of Classification Search
None
See application file for complete search history.

(56) References Cited

U.S. PATENT DOCUMENTS

| 5,051,238 A * | 9/1991 | Umetsu ................ G01N 35/025 |
| | | 422/64 |
| 2005/0071110 A1 | 3/2005 | Davis |
| 2005/0207938 A1 | 9/2005 | Hanawa et al. |
| (Continued) | | |

FOREIGN PATENT DOCUMENTS

| JP | 4-36658 | 2/1992 |
| JP | 2867670 | 3/1999 |
| (Continued) | | |

*Primary Examiner* — Kathryn Wright
(74) *Attorney, Agent, or Firm* — Oblon, McClelland, Maier & Neustadt, L.L.P.

(57) ABSTRACT

According to one embodiment, an automatic analyzing apparatus includes a reagent depository, a reagent storage unit and a probe. The reagent depository stores a first reagent vessel. The reagent storage unit is provided separately from the reagent depository and in which a second reagent vessel is placeable. The probe suctions a reagent contained in the first reagent vessel at a first position which is located above the reagent depository, suctions a reagent contained in the second reagent vessel at a second position which is located above the reagent storage unit, and discharges the reagent suctioned from the first reagent vessel or the second reagent vessel into a reaction vessel at a third position.

8 Claims, 7 Drawing Sheets

(56) References Cited

U.S. PATENT DOCUMENTS

| | | |
|---|---|---|
| 2007/0224083 A1 | 9/2007 | Ouchi et al. |
| 2008/0011106 A1 | 1/2008 | Kitagawa et al. |
| 2008/0014118 A1 | 1/2008 | Kitagawa et al. |
| 2008/0024301 A1 | 1/2008 | Fritchie et al. |
| 2008/0050279 A1 | 2/2008 | Fujita |
| 2008/0056939 A1 | 3/2008 | Awata et al. |
| 2012/0003121 A1 | 1/2012 | Shibata et al. |
| 2012/0294762 A1 | 11/2012 | Frank et al. |
| 2012/0301359 A1 | 11/2012 | Kraemer et al. |
| 2015/0010436 A1 | 1/2015 | Okusa et al. |
| 2015/0044096 A1 | 2/2015 | Nakasawa et al. |
| 2015/0111288 A1* | 4/2015 | Wilson .................. B01L 3/5085 435/287.2 |

FOREIGN PATENT DOCUMENTS

| | | |
|---|---|---|
| JP | 2005-37171 | 2/2005 |
| JP | 2005-274470 | 10/2005 |
| JP | 2006-337386 | 12/2006 |
| JP | 2007-506975 | 3/2007 |
| JP | 2007-256084 | 10/2007 |
| JP | 2008-32670 | 2/2008 |
| JP | 2008-32688 | 2/2008 |
| JP | 2008-46033 | 2/2008 |
| JP | 2008-58125 | 3/2008 |
| JP | 2008-216173 | 9/2008 |
| JP | 2009-68992 | 4/2009 |
| JP | 2009-68993 | 4/2009 |
| JP | 2011-27636 | 2/2011 |
| JP | 2011-137641 | 7/2011 |
| JP | 2011-257427 | 12/2011 |
| JP | 2012-32191 | 2/2012 |
| JP | 2012-108010 | 6/2012 |
| JP | 2012-112942 | 6/2012 |
| JP | 2012-122865 | 6/2012 |
| JP | 2012-189611 | 10/2012 |
| JP | 2013-148564 | 8/2013 |
| JP | 2013-217741 | 10/2013 |
| JP | 2013-238607 | 11/2013 |
| JP | 2014-9989 | 1/2014 |
| JP | 2014-139580 | 7/2014 |
| JP | 2015-114122 | 6/2015 |
| WO | WO 2011/012657 A1 | 2/2011 |

* cited by examiner

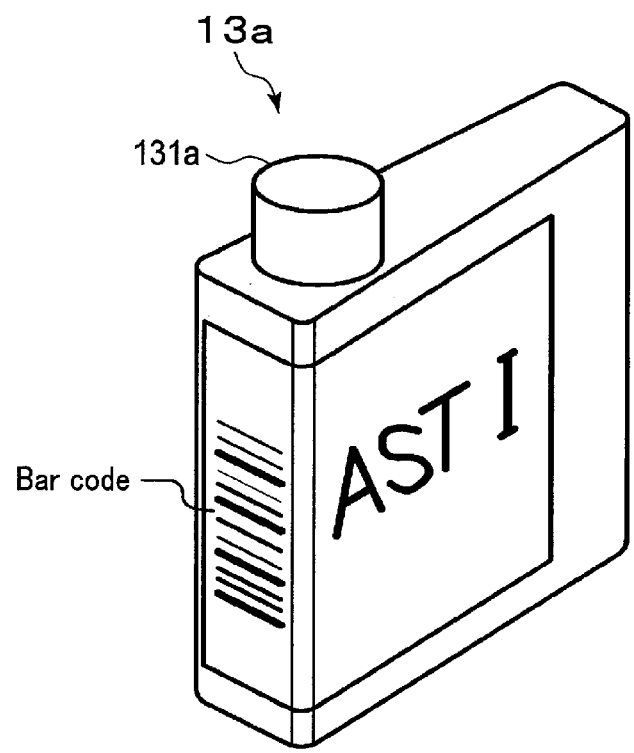
F I G. 3
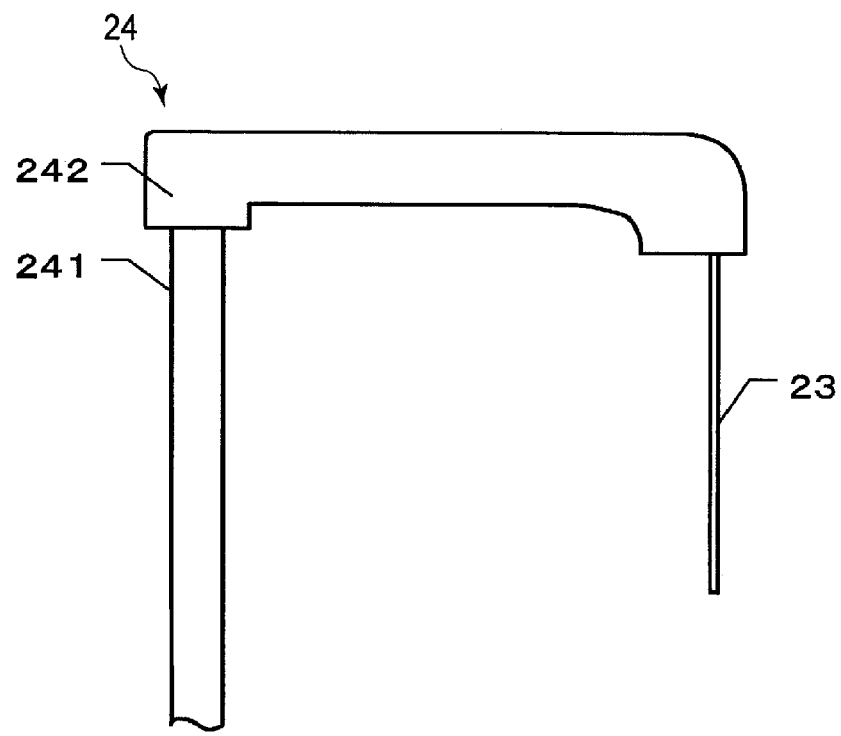
F I G. 4

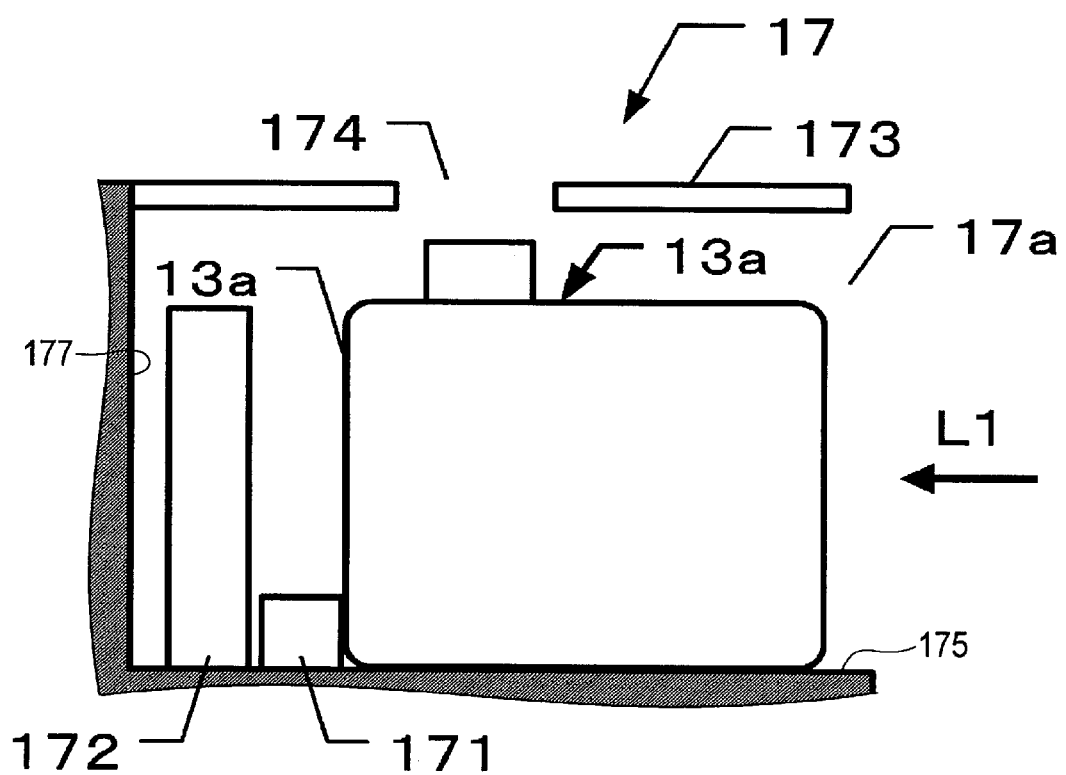
F I G. 6

AUTOMATIC ANALYZING APPARATUS

CROSS-REFERENCE TO RELATED APPLICATIONS

This application is based upon and claims the benefit of priority from the prior Japanese Patent Application No. 2016-181546, filed Sep. 16, 2016 and No. 2017-175565, filed Sep. 13, 2017, the entire contents of both which are incorporated herein by reference.

FIELD

Embodiments described herein relate generally to an automatic analyzing apparatus which dispenses reagents and test samples, such as blood and urine extracted from an object, and measures a solution mixture of dispensed test samples and reagents.

BACKGROUND

An automatic analyzing apparatus is used to analyze biological test items and immunological test items, and optically measures a change in color or turbidity caused by the reaction of a solution mixture of test samples extracted from an object and a reagent of each test item. By this measurement, the automatic analyzing apparatus generates analysis data represented by, for example, the concentrations of various test item components in test samples and the activity of an enzyme.

This automatic analyzing apparatus includes a reagent depository which is capable of storing a number of reagent vessels containing various reagents for a variety of test items, and a reagent dispensing probe which dispenses a reagent in a reagent vessel stored in the reagent depository to a reaction vessel. The apparatus dispenses a reagent of a test item selected from a number of test items in accordance with a test to be performed to a reaction vessel, and measures a solution mixture of a test sample and the reagent in the reaction vessel to generate analysis data. If an amount of the reagent in the reagent vessel has decreased as a result of the dispensing, the reagent vessel needs to be replaced with a reagent vessel fully containing the same reagent before the reagent runs short.

To store the refill reagent vessel containing the reagent in the reagent depository while a dispense operation is carried out by a reagent dispensing probe, the operation of dispensing the reagent has to be temporarily stopped to avoid contact or collision between the refill reagent vessel to be stored and the reagent dispensing probe. If the dispensing operation by the reagent dispensing probe is interrupted, it may take more time to perform a test.

BRIEF DESCRIPTION OF THE DRAWINGS

FIG. 3 is a diagram showing an appearance of a first reagent vessel according to the embodiment.

FIG. 4 is a diagram showing an appearance of a first reagent dispensing probe and a first reagent dispensing arm according to the embodiment.

FIG. 6 is a diagram showing a first reagent storage room according to the embodiment.

DETAILED DESCRIPTION

In general, according to one embodiment, an automatic analyzing apparatus includes a reagent depository, a reagent storage unit and a probe. The reagent depository stores a first reagent vessel. The reagent storage unit is provided separately from the reagent depository and in which a second reagent vessel is placeable. The probe suctions a reagent contained in the first reagent vessel at a first position which is located above the reagent depository, suctions a reagent contained in the second reagent vessel at a second position which is located above the reagent storage unit, and discharges the reagent suctioned from the first reagent vessel or the second reagent vessel into a reaction vessel at a third position.

Hereinafter, an embodiment will be described with reference to the drawings.

Figure 1:
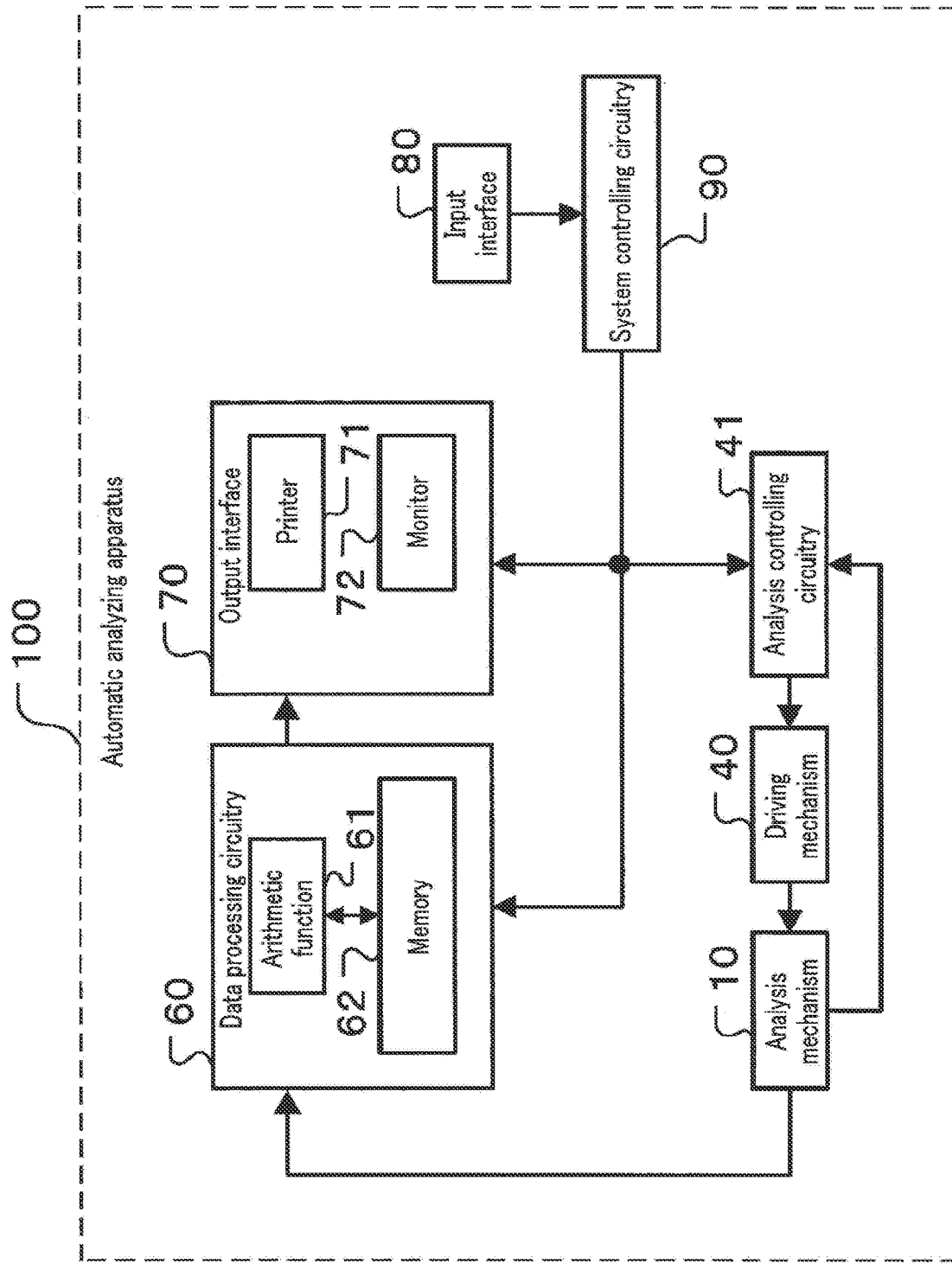
FIG. 1 is a block diagram showing a configuration of an automatic analyzing apparatus according to an embodiment.

FIG. 1 is a block diagram showing the arrangement of an automatic analyzing apparatus according to an embodiment. The automatic analyzing apparatus 100 includes an analysis mechanism 10, a driving mechanism 40, analysis controlling circuitry 41, data processing circuitry 60, an output interface 70, an input interface 80, and system controlling circuitry 90.

The analysis mechanism 10 measures a solution mixture of a standard test sample according to a test item, and/or a test sample, such as an object test sample extracted from an object, and a reagent of the test item, and generates standard data and/or object data. The analysis mechanism 10 consists of a plurality of units that carry out dispensing of test samples and reagents, etc. Dispensing of a test sample is, for example, to suction a predetermined test sample from a predetermined sample vessel and discharge the suctioned test sample to a predetermined reaction vessel. Dispensing of a reagent is, for example, to suction a predetermined reagent from a predetermined reagent vessel, and discharge the suctioned reagent into a predetermined reaction vessel.

The driving mechanism 40 drives the units constituting the analysis mechanism 10. The analysis controlling circuitry 41 controls the driving mechanism 40 to operate each unit of the analysis mechanism 10.

The data processing circuitry 60 processes the standard data generated by the analysis mechanism 10 and generates calibration data of a test item. The data processing circuitry 60 processes object data, and calibration data of a test item corresponding to the object data, and generates analysis data of a test item. The output interface 70 outputs, by printing and displaying, the calibration data and/or the analysis data generated by the data processing circuitry 60.

The input interface 80 receives inputs to set analysis parameters, such as amounts of a test sample and a reagent dispensed for each test item, inputs to carry out calibration to generate calibration data, and inputs to carry out a test to generate analysis data.

The system controlling circuitry 90 controls the analysis controlling circuitry 41, the data processing circuitry 60, and the output interface 70.

Figure 2:
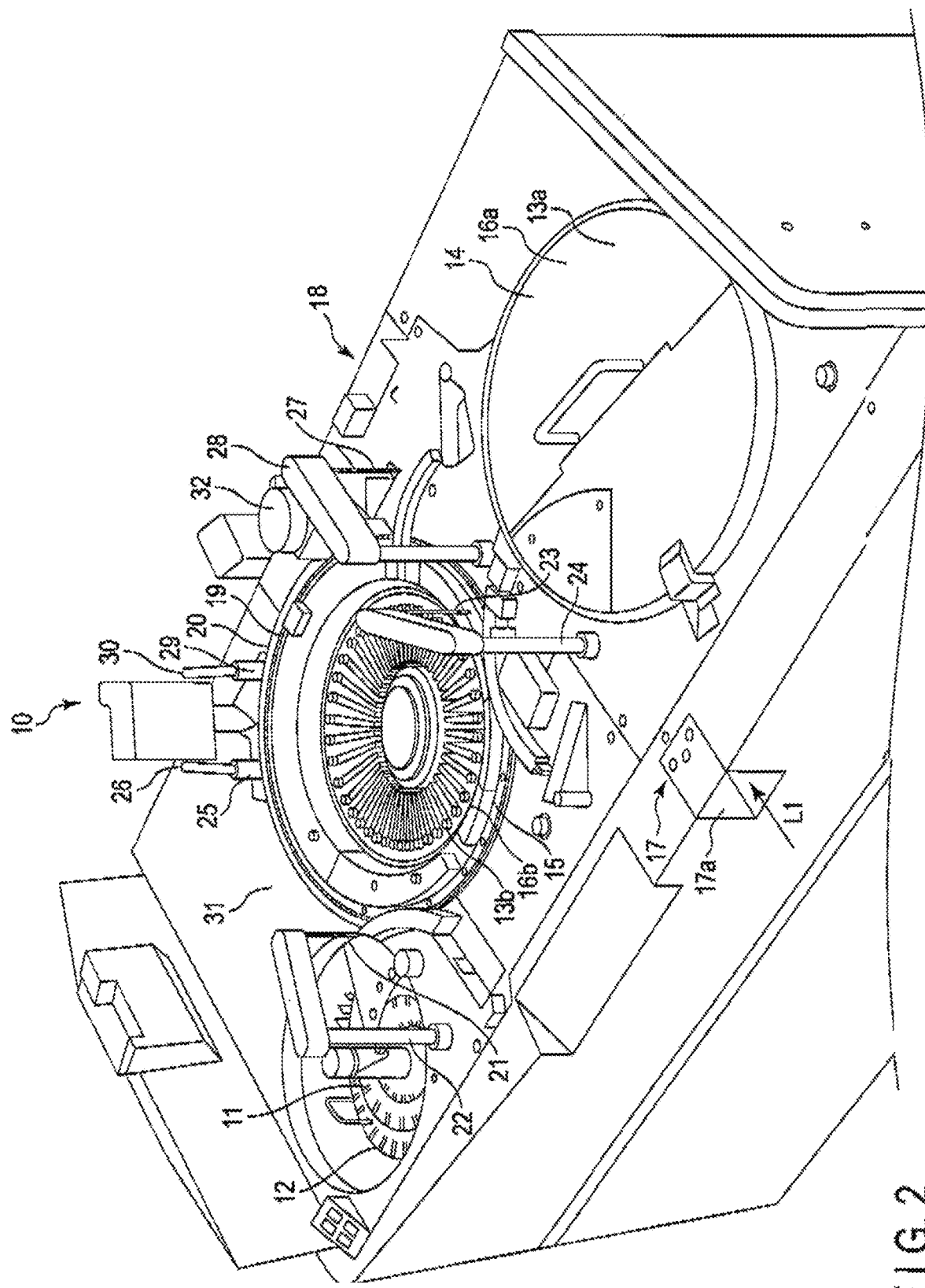
FIG. 2 is a perspective view showing a configuration of an analysis mechanism according to the embodiment.

FIG. 2 is a perspective view showing the configuration of the analysis mechanism 10. The analysis mechanism 10 includes a sample disc 12, a first reagent depository 14, a second reagent depository 15, a first reagent rack 16a, a second reagent rack 16b, a first reagent storage room 17, and a second reagent storage room 18 (which also may be referred to as a reagent storage unit).

The sample disc 12 stores a plurality of test sample vessels 11. Each test sample vessel 11 contains a test sample, such as a standard test sample for a test item, an object test sample, an accuracy management sample for accuracy management, etc.

The first reagent depository 14 stores a plurality of first reagent vessels 13a, and keeps cool the reagents of test items contained in the first reagent vessels 13a. The second reagent depository 15 stores a plurality of second reagent vessels 13b, and keeps cool the reagents of test items contained in the second reagent vessels 13b.

The first reagent rack 16a is arranged in the first reagent depository 14, and movably holds the plurality of first reagent vessels 13a stored in the first reagent depository 14. The second reagent rack 16b is arranged in the second reagent depository 15, and movably holds the plurality of second reagent vessels 13b stored in the second reagent depository 15.

The first reagent vessels 13a can be placed in the first reagent storage room 17. The second reagent vessels 13b can be placed in the second reagent storage room 18.

The analysis mechanism 10 further includes a plurality of reaction vessels 19 arranged on the circumference, and a reaction disc 20 that holds the reaction vessels 19 in a rotational and movable manner.

The first reagent vessels 13a held by the first reagent rack 16a and the first reagent vessels 13a placed in the first reagent storage room 17 contain, for example, a first reagent of a one-reagent system or a two-reagent system, and the first reagent contains a component that reacts with a component in a test sample. The second reagent vessel 13b held by the second reagent rack 16b and the second reagent vessel 13b placed in the second reagent storage room 18 contain, for example, a second reagent that constitutes a pair with a first reagent of a second-reagent system.

The analysis mechanism 10 includes a sample dispensing probe 21 and a sample dispensing arm 22. The sample dispensing probe 21 suctions a test sample in each test sample vessel 11 held by the sample disc 12 according to a test item, and discharges the test sample to the reaction vessel 19. The sample dispensing arm 22 supports the sample dispensing probe 21 in a rotationally and vertically movable manner.

The analysis mechanism 10 includes a first reagent dispensing probe 23 and a first reagent dispensing arm 24. The first reagent dispensing probe 23 suctions a first reagent in either the first reagent vessel 13a held by the first reagent rack 16a, or the first reagent vessel 13a placed in the first reagent storage room 17, and discharges the first reagent into the reaction vessel 19 containing the test sample. The first reagent dispensing arm 24 supports the first reagent dispensing probe 23 in a rotationally and vertically movable manner.

The analysis mechanism 10 includes a first stirrer 25 and a first stirring arm 26. The first stirrer 25 stirs a solution mixture of the test sample and the first reagent dispensed in the reaction vessel 19. The first stirring arm 26 supports the first stirrer 25 in a rotationally and vertically movable manner.

The analysis mechanism 10 includes a second reagent dispensing probe 27 and a second reagent dispensing arm 28. The second reagent dispensing probe 27 suctions a second reagent in either the second reagent vessel 13b held by the second reagent rack 16b, or the second reagent vessel 13b placed in the second reagent storage room 18, and discharges the second reagent into the reaction vessel 19 containing the first reagent. The second reagent dispensing arm 28 supports the second reagent dispensing probe 27 in a rotationally and vertically movable manner.

The analysis mechanism 10 includes a second stirrer 29 and a second stirring arm 30. The second stirrer 29 stirs a solution mixture of the test sample, the first reagent sample, and the second reagent contained in the reaction vessel 19. The second stirring arm 30 supports the second stirrer 29 in a rotationally and vertically movable manner.

The analysis mechanism 10 includes a measurement unit 31 and a cleaning nozzle 32.

The measurement unit 31 is provided in the vicinity of an optical measurement position. An optical measurement position is predetermined in the reaction disc 20. The measurement unit 31 emits light on the reaction vessel 19 which contains the solution mixture stirred by the first stirrer 25, and/or on the reaction vessel 19 which contains the solution mixture stirred by the second stirrer 29, and performs optical measurement. The measurement unit 31 has a light source and a light detector. The light source is, for example, a light emitting diode (LED), etc. The light source and the light detector are provided at a position opposite to each other with the reaction vessel 19, which is located at the optical measurement position, being interposed therebetween. The measurement unit 31 emits light from the light source in accordance with the control by the analysis controlling circuitry 41. The light detector detects light emitted from the light source in a sampling cycle which is synchronized with a cycle time, for example. Light that passes through the solution mixture discharged to the reaction vessel 19 is thus detected.

The measurement unit 31 emits light from the light source on the rotationally-moving reaction vessel 19. The measurement unit 31 emits light on the solution mixtures in the reaction vessels 19, i.e., a solution mixture containing a standard test sample, a solution mixture containing an object test sample, and a solution mixture containing an accuracy management sample, and detects light that passes through these solution mixtures. The measurement unit 31 generates standard data, object data, and accuracy management data, which are represented by absorbency based on detected signals, and outputs the data to the data processing circuitry 60.

The cleaning nozzle 32 cleans the reaction vessel 19 for which the measurement by the measurement unit 31 has been finished.

Although not shown in the drawings, the analysis mechanism 10 includes a first reagent liquid level detector and a second reagent liquid level detector. The first reagent liquid level detector detects a liquid level of the first reagent in the first reagent vessel 13a by detecting contact of the bottom portion of the first reagent dispensing probe 23 with the liquid level of the first reagent in the first reagent vessel 13a held by the first reagent rack 16a, or the first reagent in the first reagent vessel 13a placed in the first reagent storage room 17. The second reagent liquid level detector detects a liquid level of the second reagent in the second reagent vessel 13b by detecting contact of the bottom portion of the second reagent dispensing probe 27 with the liquid level of the second reagent in the second reagent vessel 13b held by the second reagent rack 16b, or the second reagent in the second reagent vessel 13b placed in the second reagent storage room 18.

The driving mechanism 40 shown in FIG. 1 drives the sample disc 12 of the analysis mechanism 10 to move the test sample vessels 11 rotationally. The driving mechanism 40 drives the first reagent rack 16a to move the first reagent vessels 13a rotationally. The driving mechanism 40 drives the second reagent rack 16b to rotationally move the second reagent vessels 13b. The driving mechanism 40 drives the reaction disc 20 to move the reaction vessels 19 rotationally. The driving mechanism 40 has a function of rotationally and vertically moving the sample dispensing arm 22, and moves the sample dispensing probe 21 between the test sample vessel 11 and the reaction vessel 19.

The driving mechanism 40 has a rotation mechanism for rotationally moving the first reagent dispensing arm 24, and a vertical movement mechanism for vertically moving the same. The driving mechanism 40 moves the first reagent dispensing probe 23 between the reaction vessel 19 and either the first reagent vessel 13a held by the first reagent rack 16a, or the first reagent vessel 13a placed in the first reagent storage room 17. The driving mechanism 40 drives the first stirring arm 26 to move the first stirrer 25 to the inside of the reaction vessel 19.

The driving mechanism 40 has a rotation mechanism for rotationally moving the second reagent dispensing arm 28, and a vertical movement mechanism for vertically moving the same. The driving mechanism 40 moves the second reagent dispensing probe 27 between the reaction vessel 19 and either the second reagent vessel 13b held by the second reagent rack 16b, or the second reagent vessel 13b placed in the second reagent storage room 18. The driving mechanism 40 drives the second stirring arm 30 to move the second stirrer 29 to the inside of the reaction vessel 19.

The analysis controlling circuitry 41 includes a processor and storage circuitry. When an input to instruct carrying out calibration is made from the input interface 80, the analysis controlling circuitry 41 controls the driving mechanism 40 to operate the cleaning nozzle 32 to clean each reaction vessel 19. The analysis controlling circuitry 41 controls the driving mechanism 40 to operate the sample dispensing probe 21 and the sample dispensing arm 22 to perform suction and discharging of a standard test sample of each test item. The analysis controlling circuitry 41 controls the driving mechanism 40, and operates the first reagent dispensing probe 23 and the first reagent dispensing arm 24 to perform suction and discharging of a first reagent of each test item. The analysis controlling circuitry 41 controls the driving mechanism 40 to operate the first stirrer 25 and the first stirring arm 26 to stir a solution mixture of a standard test sample and a first reagent of each test item. The analysis controlling circuitry 41 controls the driving mechanism 40 to operate the second reagent dispensing probe 27 and the second reagent dispensing arm 28 to perform suction and discharging of a second reagent of each test item. The analysis controlling circuitry 41 controls the driving mechanism 40 to operate the second stirrer 29 and the second stirring arm 30 to stir a solution mixture of a standard test sample, a first reagent, and a second reagent of each test item. The analysis controlling circuitry 41 controls the driving mechanism 40, operates the measurement unit 31, and measures a solution mixture of a standard test sample, a first reagent, and a second reagent of each test item. Standard data of each test item is thus generated.

The analysis controlling circuitry 41 causes each unit of the analysis mechanism 10 to perform the above operations respectively in every cycle in order to generate standard data of each test item.

When an input to instruct carrying out a test is made from the input interface 80 after calibration is finished, the analysis controlling circuitry 41 controls the driving mechanism 40 to operate the cleaning nozzle 32 to clean the reaction vessels 19. The analysis controlling circuitry 41 controls the driving mechanism 40, and operates the sample dispensing probe 21 and the sample dispensing arm 22 to perform suction and discharging of an object test sample and/or an accuracy management sample. The analysis controlling circuitry 41 controls the driving mechanism 40, and operates the first reagent dispensing probe 23 and the first reagent dispensing arm 24 to perform suction and discharging of a first reagent of each test item. The analysis controlling circuitry 41 controls the driving mechanism 40, and operates the first stirrer 25 and the first stirring arm 26 to stir a solution mixture of the object test sample and the first reagent for each test item and/or a solution mixture of an accuracy management sample and a first reagent of each test item. The analysis controlling circuitry 41 controls the driving mechanism 40 to operate the second reagent dispensing probe 27 and the second reagent dispensing arm 28 to perform suction and discharging of a second reagent of each test item. The analysis controlling circuitry 41 controls the driving mechanism 40 to operate the second stirrer 29 and the second stirring arm 30 to stir a solution mixture of an object test sample and first and second reagents of each test item, and/or a solution mixture of an accuracy management sample and first and second reagents of each test item. The analysis controlling circuitry 41 controls the driving mechanism 40 and operates the measurement unit 31 to measure a stirred solution mixture of an object test sample and first and second reagents of each test item, and/or a stirred solution mixture of an accuracy management sample and first and second reagents of each test item. Object data of each test item and/or accuracy management data are thus generated.

The analysis controlling circuitry 41 causes each unit of the analysis mechanism 10 to perform the above operations respectively in every cycle in order to generate object data of each test item and/or accuracy management data of each test item.

The analysis controlling circuitry 41 supplies driving pulses to the rotation mechanism of the first reagent dispensing arm 24 in the driving mechanism 40. The analysis controlling circuitry 41 then moves and stops the first reagent dispensing probe 23 at an upper stop position, i.e., above the first reagent vessel 13a held by the first reagent rack 16a, above the first reagent vessel 13a placed in the first reagent storage room 17, and above the reaction vessel 19. The analysis controlling circuitry 41 supplies driving pulses to the vertical movement mechanism of the first reagent dispensing arm 24 to lower the first reagent dispensing probe 23 from the upper stop position. Then, after lowering the first reagent dispensing probe 23 from the upper stop position above the first reagent vessel 13a, the analysis controlling circuitry 41 stops the first reagent dispensing probe 23 at a position where a liquid level of the first reagent in the first reagent vessel 13a is detected by the first reagent liquid level detector, and then causes the first reagent dispensing probe 23 to suction the first reagent in the first reagent vessel 13a.

The analysis controlling circuitry 41 supplies driving pulses to the rotation mechanism of the second reagent dispensing arm 28. The analysis controlling circuitry 41 then moves and stops the second reagent dispensing probe 27 at an upper stop position, i.e., above the second reagent vessel 13b held by the second reagent rack 16b, above the second reagent vessel 13b placed in the second reagent storage room 18, and above the reaction vessel 19. The analysis controlling circuitry 41 supplies driving pulses to the vertical movement mechanism of the second reagent dispensing arm 28 to lower the second reagent dispensing probe 27 from each upper stop position. Then, after lowering the second reagent dispensing probe 27 from the upper stop position above the second reagent vessel 13b, the analysis controlling circuitry 41 stops the second reagent dispensing probe 27 at a position where a liquid level of the second reagent in the second reagent vessel 13b is detected by the second reagent liquid level detector, and then causes the second reagent dispensing probe 27 to suction the second reagent in the second reagent vessel 13b.

The analysis controlling circuitry 41 calculates an amount of the first reagent in each of the first reagent vessels 13a held by the first reagent rack 16a based on a predetermined dimension of the first reagent vessel 13a, a height of the first reagent vessel 13a held by the first reagent rack 16a, and the number of the driving pulses required for lowering the first reagent dispensing probe 23 from the upper stop position to the detection position. The analysis controlling circuitry 41 calculates an amount of the first reagent in each of the first reagent vessels 13a placed in the first reagent storage room 17 based on a height of the first reagent vessel 13a placed in the first reagent storage room 17 and the number of the driving pulses required for lowering the first reagent dispensing probe 23 from the upper stop position to the detection position.

When the calculated amount of the first reagent in each first reagent vessel 13a decreases and reaches a predetermined warning amount corresponding to the number of times of possible dispensing, the analysis controlling circuitry 41 causes the output interface 70 to output reagent information of the first reagent and a message indicating a warning of a shortage of the first reagent.

The analysis controlling circuitry 41 calculates an amount of the second reagent in each of the second reagent vessels 13b held by the second reagent rack 16b based on a predetermined dimension of the second reagent vessel 13b, a height of the second reagent vessel 13b held by the second reagent rack 16b, and the number of the driving pulses required for lowering the second reagent dispensing probe 27 from the upper stop position to the detection position. The analysis controlling circuitry 41 calculates an amount of the second reagent in each of the second reagent vessels 13b placed in the second reagent storage room 18 based on a height of the second reagent vessel 13b placed in the second reagent storage room 18 and the number of the driving pulses required for lowering the second reagent dispensing probe 27 from the upper stop position above the second reagent vessel 13b placed in the second reagent storage room 18 to the detection position.

When the calculated amount of the second reagent in each second reagent vessel 13b decreases and reaches a predetermined warning amount corresponding to the number of times of possible dispensing, the analysis controlling circuitry 41 causes the output interface 70 to output reagent information of the second reagent and a message indicating a warning of a shortage of the second reagent.

The data processing circuitry 60 includes a memory 62. The data processing circuitry 60 achieves the arithmetic function 61 shown in FIG. 1 by running an operation program which is read from the memory 62, for example. In other words, the data processing circuitry 60 includes an arithmetic function 61. By executing the arithmetic function 61, the data processing circuitry 60 generates calibration data of each test item indicating a relationship between a standard value and the standard data based on the standard data generated by the measurement unit 31 of the analysis mechanism 10 and a standard value which is set for a standard test sample in the standard data. The data processing circuitry 60 generates analysis data represented by a concentration value or an activity value based on the object data generated by the measurement unit 31, using the calibration data of a test item corresponding to the object data. The data processing circuitry 60 generates accuracy management sample data represented by a concentration value or an activity value based on the accuracy management data generated by the measurement unit 31, using the calibration data of a test item corresponding to the accuracy management data. The memory 62 includes a memory device, such as a hard disk, and stores the calibration data and the accuracy management sample data generated by the data processing circuitry 60 for each test item. The memory 62 also stores the analysis data of each test item generated by the data processing circuitry 60 for each object test sample.

The output interface 70 includes a printer 71 and a monitor 72. The printer 71 outputs, by printing out, the standard data, analysis data, and accuracy management sample data, etc. generated by the data processing circuitry 60. The monitor 72 outputs, by displaying, the standard data, analysis data, and accuracy management sample data, etc. generated by the data processing circuitry 60. The printer 71 includes a printer and the like, and outputs the calibration data, the analysis data, and the accuracy management sample data, by printing them out onto a printer sheet in accordance with a preset format.

The monitor 72 includes a monitor, such as a CRT and a liquid crystal panel, and displays a screen for setting analysis parameters, such as an amount of reagent necessary for measurement of each test item, an amount of the first reagent of a one-reagent system and a two-reagent system, an amount of the second reagent of a two-reagent system, and the like. The monitor 72 displays a screen for setting a test item for which calibration should be carried out. The monitor 72 also displays a screen for setting a test item and identification information, such as names and IDs, for identifying an object test sample for which a test is carried out. The monitor 72 also displays the calibration data, the analysis data, and the accuracy management sample data. The monitor 72 further displays reagent information and a message indicating a warning of a shortage of the first reagent in the first reagent vessel 13a, if an amount of the first reagent reaches a warning amount corresponding to the number of times of possible dispensing. The monitor 72 further displays reagent information and a message indicating a warning of a shortage of the second reagent in the second reagent vessel 13b, if an amount of the second reagent reaches a warning amount corresponding to the number of times of possible dispensing.

The input interface 80 includes input devices, such as a keyboard, a mouse, buttons, and a touch key panel, to input setting of analysis parameters for each test item. The input interface 80 accepts inputs to set a test item for which calibration is carried out. The input interface 80 also accepts inputs to set a test item and identification information of an object test sample for which a test is carried out. The input interface 80 also accepts inputs for carrying out calibration and a test, etc.

The system controlling circuitry 90 includes a processor and storage circuitry. The system controlling circuitry 90 stores, in the storage circuitry, the information which is input from the input interface 80, such as the information of the analysis parameters for each test item, the identification information, and the test item, etc. The system controlling circuitry 90 controls the entire system by integrating the analysis controlling circuitry 41, the data processing circuitry 60, and the output interface 70, based on the input information.

Next, the configuration and operation of the first reagent vessel 13a, the first reagent dispensing probe 23, the first reagent dispensing arm 24, the first reagent depository 14, and the first reagent storage room 17 related to suction and discharging of a first reagent by the analysis mechanism 10, and the configuration and operation of the second reagent vessel 13b, the second reagent dispensing probe 27, the second reagent dispensing arm 28, the second reagent depository 15, and the second reagent storage room 18 related to suction and discharging of a second reagent will be described in detail.

FIG. 3 is a diagram showing an appearance of the first reagent vessel 13a. The first reagent vessel 13a has a square-pillar shape, and in the vicinity of one end on its upper surface, has an opening 131a which the first reagent dispensing probe 23 enters. Among the four side surfaces constituting the first reagent vessel 13a, on one side surface sharing its short side with the short side of the upper surface in the vicinity of the opening, reagent information, such as a bar code, to identify the first reagent in the first reagent vessel 13a, such as a test item, etc., is indicated. Since the configuration of the second reagent vessel 13b is similar to that of the first reagent vessel 13a, the description thereof is omitted.

FIG. 4 is a diagram showing an appearance of the first reagent dispensing probe 23 and the first reagent dispensing arm 24. The first reagent dispensing probe 23 is tubular, and on its lower end, it has an opening for suctioning and discharging a first reagent. The upper end is supported by the first reagent dispensing arm 24. The first reagent dispensing arm 24 consists of a shaft 241 which is rotationally and vertically driven by the driving mechanism 40, and by an arm 242 which has one end stationarily mounted to the upper end of the shaft 241 and the other end supporting the first reagent dispensing probe 23. Since the configurations of the second reagent dispensing probe 27 and the second reagent dispensing arm 28 are similar to those of the first reagent dispensing probe 23 and the first reagent dispensing arm 24, the description thereof is omitted.

Figure 5:
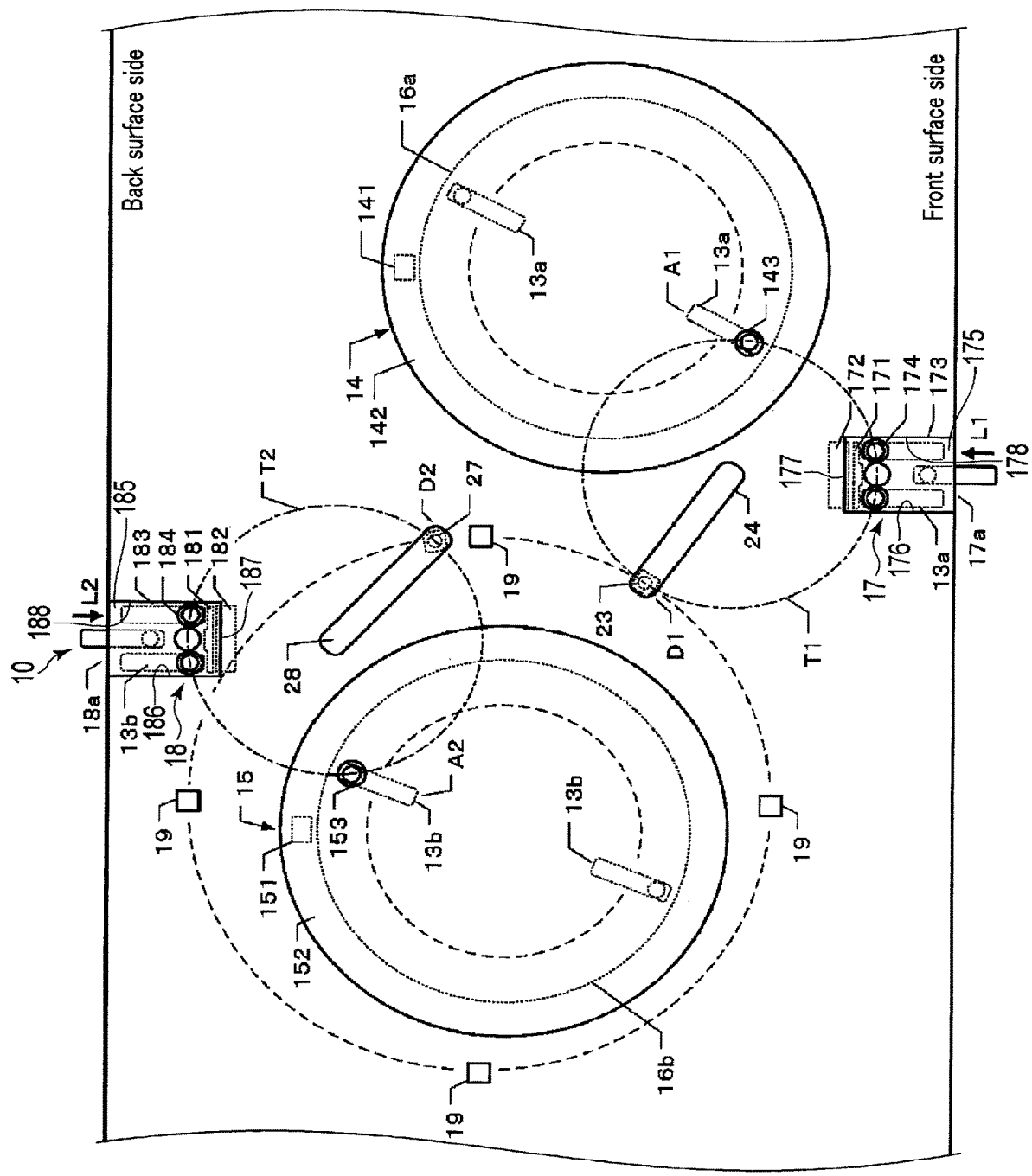
FIG. 5 is a plan view showing an example of an arrangement of units related to dispensing of first and second reagents in the analysis mechanism according to the embodiment.

FIG. 5 is a plan view showing an example of an arrangement of units in the analysis mechanism 10 for dispensing the first and second reagents.

The first reagent depository 14 includes a reader 141 and a reagent cover 142. The reader 141 reads reagent information indicated on the first reagent vessel 13a held by the first reagent rack 16a. The reagent cover 142 covers the opening portion provided in the upper portion of the first reagent depository 14, and the cover can be freely opened and closed. The first reagent vessel 13a is stored and taken out from the first reagent depository 14 through this opening. The opening of the first reagent depository 14 is blocked by the reagent cover 142 to keep the first reagent in the first reagent vessel 13a held by the first reagent rack 16a cool, except for when the first reagent vessel 13a is put into and taken out. In the reagent cover 142, a penetrating hole 143 is provided in the upper portion of the first reagent vessel 13a of the suction position A1 to allow the lowered first reagent dispensing probe 23 to enter the vessel.

The first reagent storage room 17 is provided separately from the first reagent depository 14, the second reagent depository 15, and the second reagent storage room 18. The first reagent storage room 17 is arranged in such a manner that the predetermined number of the first reagent vessels 13a can be placed therein. The predetermined number is less than the number of the first reagent vessels 13a that can be held by the first reagent rack 16a arranged in the first reagent depository 14. The predetermined number is, for example, three, as illustrated in FIG. 5.

A placement surface 175 is provided on a bottom surface of the first reagent storage room 17. The placement surface 175 is a surface on which the first reagent vessel 13a can be placed. The placement surface 175 is part of the analysis mechanism 10. The placement surface 175 is provided a predetermined distance below the upper surface of the analysis mechanism 10. The distance from the upper surface of the analysis mechanism 10 to the placement surface 175 is greater than the distance from the bottom surface of the first reagent vessel 13a to the opening 131a, for example.

A first side surface 176, a second side surface 177, and a third side surface 178 are provided in the first reagent storage room 17 in such a manner that the surfaces are located on the peripheral edge of the placement surface 175. The first side surface 176, the second side surface 177, and the third side surface 178 are part of the analysis mechanism 10.

The first reagent storage room 17 has a reagent cover 173 at a position opposite to the placement surface 175. The reagent cover 173 covers all of the first reagent vessels 13a placed on the placement surface 175. The reagent cover 173 is approximately flush with the upper surface of the analysis mechanism 10. Furthermore, three penetrating holes 174 are provided in the reagent cover 173, so that the first reagent dispensing probe 23 can enter the three first reagent vessels 13a placed at predetermined positions when the probe is lowered from above.

As shown in FIGS. 5 and 6, the first reagent storage room 17 is comprised of the placement surface 175, the first side surface 176, the second side surface 177, the third side surface 178, and the reagent cover 173.

Although not shown, the first reagent storage room 17 may include a Peltier device, etc. to keep cool the first reagent in the first reagent vessels 13a placed therein.

An intake port 17a is provided in one of the side surfaces of the first reagent storage room 17. The intake port 17a is provided on the front side surface of the analysis mechanism 10, as shown in FIG. 2. In the first reagent storage room 17, as shown in FIG. 6, the first reagent vessel 13a is horizontally pushed in the direction of arrow L1 from the intake port 17a, with the side surface on which the bar code is indicated facing the front side surface of the analysis mechanism 10, until the vessel is abutted to the detector 171, thereby placing up to three first reagent vessels 13a at a predetermined position.

The first reagent storage room 17 includes a detector 171 and a reader 172.

By being abutted to the side surface where the bar code of the first reagent vessel 13a is indicated, the detector 171 detects the first reagent vessel 13a. The reader 172 reads reagent information indicated on the first reagent vessel 13a detected by the detector 171.

Thus, it is possible to place the first reagent vessel 13a at a predetermined position at which the first reagent dispensing probe 23 can be entered by pushing the first reagent vessel 13a in the direction L1 until the position where the vessel is abutted to the detector 171.

Placed in the first reagent storage room 17 is a first reagent vessel 13a containing a first reagent of a test item that is not usually held by the first reagent rack 16a because of a low frequency of carrying out a test. Also placed in the first reagent storage room 17 is a first reagent vessel 13a containing a first reagent of the same test item as the first reagent vessel 13a that is held by the first reagent rack 16a and in which an amount of the first reagent has decreased to a predetermined warning amount.

Figure 7A:
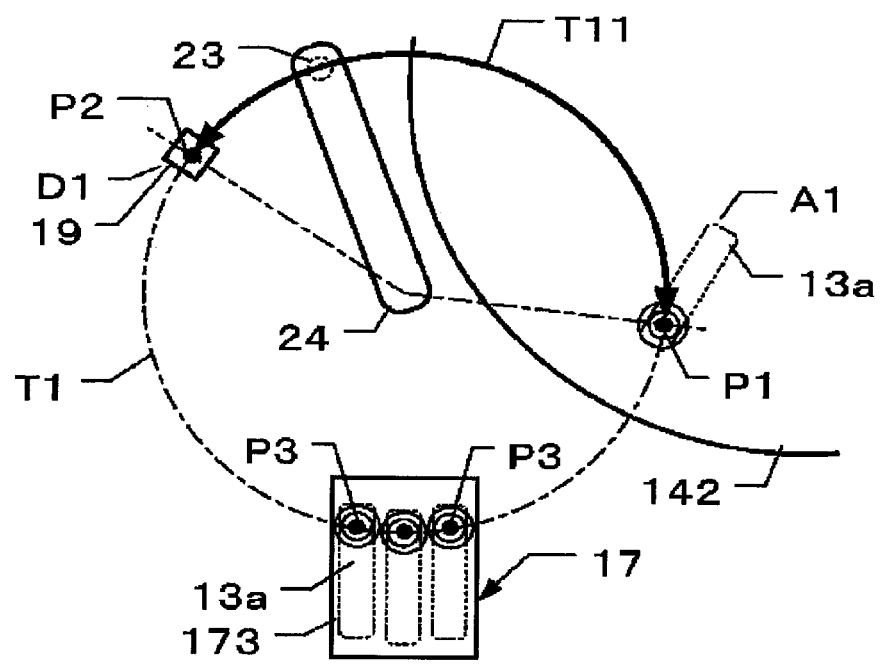
FIG. 7A is a diagram showing an example of a track of the first reagent dispensing probe according to the embodiment.

As shown in FIG. 7A, the first reagent dispensing arm 24 supports the first reagent dispensing probe 23 such that the probe 23 is horizontally movable along the first track T11, defining an arc having the first upper stop position P1 and the second upper position P2 as its ends as a first track T11 on the circumference T1 as indicated by the arrow. The first upper stop position P1 is located above the first reagent vessel 13a held by the first reagent rack 16a at the suction position A1. The second upper stop position P2 is located above the reaction vessel 19 at the discharge position D1.

Furthermore, as shown in FIG. 7A, the first reagent dispensing arm 24 supports the first reagent dispensing probe 23 in such a manner that the probe can be moved downward from each of the first upper stop position P1 and the second upper stop position P2.

Figure 7B:
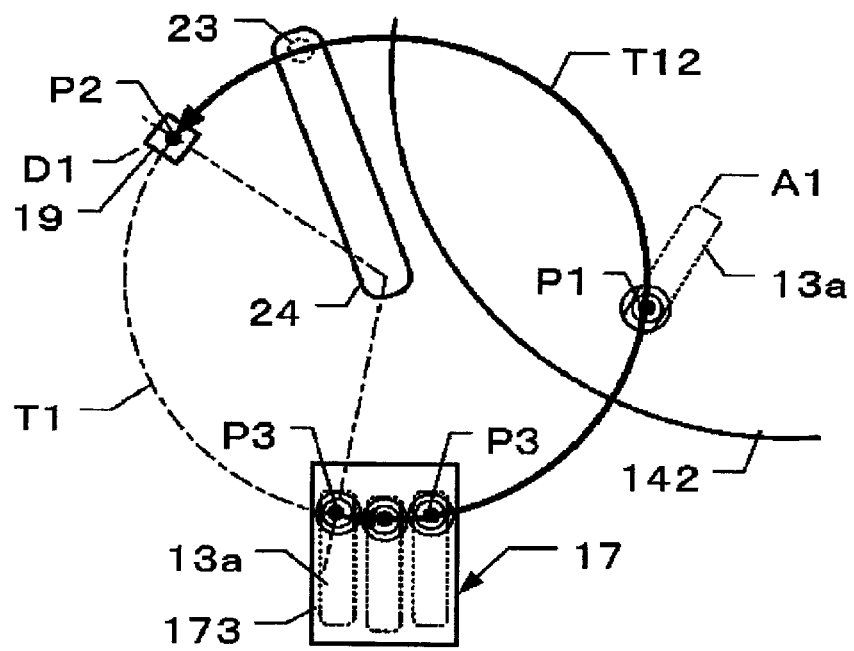
FIG. 7B is a diagram showing an example of a track of the first reagent dispensing probe according to the embodiment.

As shown in FIG. 7B, the first reagent dispensing arm 24 supports the first reagent dispensing probe 23 such that the probe 23 is horizontally movable along the second track T12, defining an arc having the third upper stop position P3 and the second upper stop position P2 as its ends as a second track T12. The third upper stop position P3 is above the three first reagent vessels 13a placed at the predetermined position in the first reagent storage room 17, and is located on an elongation line of the first track T11 on the circumference T1. The second track T12 is expressed by the arc on the circumference T1.

Furthermore, as shown in FIG. 7B, the first reagent dispensing arm 24 supports the first reagent dispensing probe 23 in such a manner that the probe can be moved downward from each of the second upper stop position P2 and the third upper stop position P3.

In FIG. 7 (b), the second track T12 is defined as the major arc on the circumference T1 which includes the first track T11; however, the track may be defined as the minor arc determined by the third upper stop position P3 and the second upper stop position P2 on the circumference T1, not including the second track T12. At this time, the first reagent dispensing arm 24 supports the first reagent dispensing probe 23 in a horizontally movable manner along the track on the minor arc. The track of the first reagent dispensing probe 23 is not limited to a circumference-drawing track, and may be a curve-drawing track, as appropriate.

Under the control of the analysis controlling circuitry 41, the first reagent dispensing probe 23 dispenses per cycle the first reagent in the first reagent vessel 13a that has been moved to the suction position A1 among the plurality of first reagent vessels 13a held by the first reagent rack 16a. Defining a predetermined position on the first track T11 as a base position, the first reagent dispensing probe 23 is horizontally moved along the first track T11 from the base position, and is stopped at the first upper stop position P1. Subsequently, the first reagent dispensing probe 23 is lowered from the first upper stop position P1, and is stopped at a position where the liquid level of the first reagent in the first reagent vessel 13a at the suction position A1 is detected by the first reagent detector. After suctioning the first reagent at the stop position, the first reagent dispensing probe 23 is raised and stopped at the first upper stop position P1, and is then horizontally moved along the first track T11 and stopped at the second upper stop position P2. Subsequently, after discharging the first reagent into the reaction vessel 19 at the discharge position D1 at the second upper stop position P2, the first reagent dispensing probe 23 is horizontally moved to the base position along the first track T11. The first reagent dispensing probe 23 performs one series of the above-described operations in one cycle.

Defining a base position on the second track T12 as the base position on the first track T11, the first reagent dispensing probe 23 is horizontally moved from the base position along the second track T12 under the control of the analysis controlling circuitry 41. The first reagent dispensing probe 23 is then stopped at the third upper stop position P3 above the first reagent vessel 13a, which is at a position where the reagent information is read by the reader 172. Subsequently, the first reagent dispensing probe 23 is lowered from the third upper stop position P3, and is stopped at a position where the liquid level of the first reagent in the first reagent vessel 13a is detected by the first reagent detector. After suctioning the first reagent, the first reagent dispensing probe 23 is raised and stopped at the third upper stop position P3, and is then horizontally moved along the second track T12 and stopped at the second upper stop position P2. Subsequently, after discharging the first reagent into the reaction vessel 19 at the discharge position D1 at the second upper stop position P2, the first reagent dispensing probe 23 is horizontally moved to the base position along the second track T12. The first reagent dispensing probe 23 performs one series of the above-described dispensing operations in one cycle.

The first reagent dispensing probe 23 is controlled to not be lowered to a position at which the first reagent vessel 13a is not placed and is not detected by the detector 171 among the three placeable positions in the first reagent storage room 17.

Since the first reagent storage room 17 is located at a position distant from the first track T11, an operator can place the first reagent vessel 13a in the first reagent storage room 17 without contact or collision of the vessel with the first reagent dispensing probe 23 and the first reagent dispensing arm 24 while the first reagent dispensing probe 23 is dispensing the first reagent contained in the first reagent vessel 13a held by the first reagent rack 16a to the reaction vessel 19.

Furthermore, the first reagent vessel 13a can be placed in the first reagent storage room 17 by horizontally pushing the first reagent vessel 13a toward the direction of the second track T12 from the intake port 17a which is arranged in a further circumferential side than the second track T12 and below the first reagent dispensing probe 23 which is moved along the second track T12. Thus, it is possible to avoid contact or collision of the first reagent dispensing probe 23 and the first reagent dispensing arm 24 that is moved along the second track T12 with the first reagent vessel 13a to be placed in the first reagent storage room 17 or with an operator holding the first reagent vessel 13a.

If the first reagent vessel 13a is placed at the predetermined position in the first reagent storage room 17 and another first reagent vessel 13a is additionally placed, the first reagent dispensing probe 23 is lowered to the position of the additionally-placed first reagent vessel 13a, only after the first reagent vessel 13a is horizontally pushed in from the intake port 17a to a predetermined position where no first reagent vessel 13a is placed; thereby avoiding contact or collision between the first reagent vessel 13a and the first reagent dispensing probe 2.

The second reagent depository 15 includes a reader 151 and a reagent cover 152. The reader 151 reads reagent information indicated on the second reagent vessel 13b held by the second reagent rack 16b. The reagent cover 152 covers the opening portion provided in the upper portion of the second reagent depository 15, and the cover can be freely opened and closed. The second reagent vessel 13b is stored and taken out from the second reagent depository 15 through this opening. The opening of the second reagent depository 15 is blocked by the reagent cover 152 to keep cool the second reagent in the second reagent vessel 13b held by the second reagent rack 16b, except for when the second reagent vessel 13b is put in and taken out. In the reagent cover 152, a penetrating hole 153 is provided in the upper portion of the second reagent vessel 13b of the suction position A2 to allow the lowered second reagent dispensing probe 27 to be inserted into the vessel.

The second reagent storage room 18 is provided separately from the first reagent depository 14, the second reagent depository 15, and the first reagent storage room 17. The second reagent storage room 18 is arranged in such a manner that the predetermined number of the second reagent vessels 13b can be placed therein. The predetermined number is less than the number of the second reagent vessels 13b that can be held by the second reagent rack 16b. The predetermined number is, for example, three, as illustrated in FIG. 5.

A placement surface 185 is provided on a bottom surface of the second reagent storage room 18. The placement surface 185 is a surface on which the second reagent vessel 13b can be placed. The placement surface 185 is part of the analysis mechanism 10. The placement surface 185 is provided a predetermined distance below the upper surface of the analysis mechanism 10. The distance from the upper surface of the analysis mechanism 10 to the placement surface 185 is greater than the distance from the bottom surface of the second reagent vessel 13b to the opening, for example.

A first side surface 186, a second side surface 187, and a third side surface 188 are provided in the second reagent storage room 18 in such a manner that they are located on the peripheral edge of the placement surface 185. The first side surface 186, the second side surface 187, and the third side surface 188 are part of the analysis mechanism 10.

The second reagent storage room 18 has a reagent cover 183 at a position opposite to the placement surface 185. The reagent cover 183 covers all of the second reagent vessels 13b placed on the placement surface 185. The reagent cover 183 is approximately flush with the upper surface of the analysis mechanism 10. Furthermore, three penetrating holes 184 are provided in the reagent cover 183, so that the second reagent dispensing probe 27 can enter the three second reagent vessels 13b placed at predetermined positions when the probe is lowered from above.

As shown in FIGS. 5 and 6, the second reagent storage room 18 is comprised of the placement surface 185, the first side surface 186, the second side surface 187, the third side surface 188, and the reagent cover 183.

Although not shown, the second reagent storage room 18 may include a Peltier device, etc. to keep cool the second reagent in the second reagent vessels 13b placed therein.

An intake port 18a is provided in one of the side surfaces of the second reagent storage room 18. The intake port 18a is provided on the back side surface of the analysis mechanism 10. Three second reagent vessels 13b are horizontally pushed in the direction of arrow L2 from the intake port 18a, with the side surface on which the bar code is indicated facing the back side surface of the analysis mechanism 10, until the vessels are abutted to the detector 181, thereby placing the second reagent vessels 13b at a predetermined position.

The second reagent storage room 18 includes a detector 181 and a reader 182.

By being abutted to the side surface where the bar code of the second reagent vessel 13b is indicated, the detector 181 detects the second reagent vessel 13b placed in a predetermined position. The reader 182 reads reagent information indicated on the second reagent vessel 13b detected by the detector 181.

Thus, it is possible to place the second reagent vessel 13b at a predetermined position at which the second reagent dispensing probe 27 can be entered by pushing the second reagent vessel 13b in the direction L2 until the position where the vessel is abutted to the detector 181.

Placed in the second reagent storage room 18 is a second reagent vessel 13b containing a second reagent of a test item that is not usually held by the second reagent rack 16b because of a low frequency of carrying out a test. Also placed in the second reagent storage room 18 is a second reagent vessel 13b containing a second reagent of the same test item as the second reagent vessel 13b which is held by the second reagent rack 16b and in which an amount of the second reagent has decreased to a predetermined warning amount.

Figure 8A:
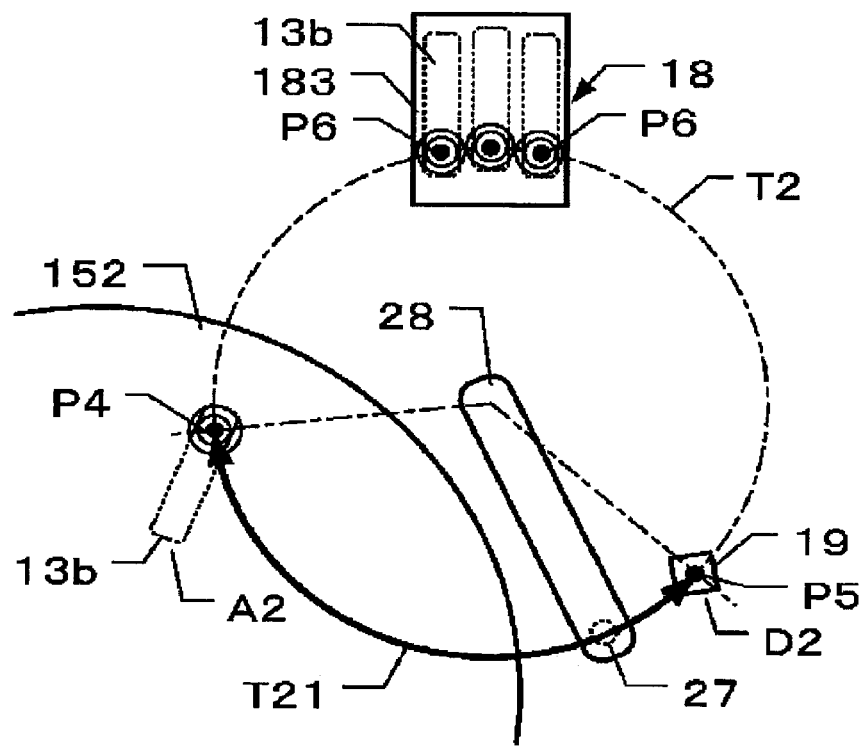
FIG. 8A is a diagram showing an example of a track of the second reagent dispensing probe according to the embodiment.

As shown in FIG. 8A, the second reagent dispensing arm 28 supports the second reagent dispensing probe 27 such that the probe 27 is horizontally movable along the third track T21, defining an arc having the fourth upper stop position P4 and the fifth upper position P5 as its ends as a third track T21 on the circumference T2 as indicated by the arrow. The fourth upper stop position P4 is located above the second reagent vessel 13b held by the second reagent rack 16b at the suction position A2. The fifth upper stop position P5 is located above the reaction vessel 19 at the discharge position D2.

Furthermore, as shown in FIG. 8A, the second reagent dispensing arm 28 supports the second reagent dispensing probe 27 in such a manner that the probe can be moved downward from each of the fourth upper stop position P4 and the fifth upper stop position P5.

Figure 8B:
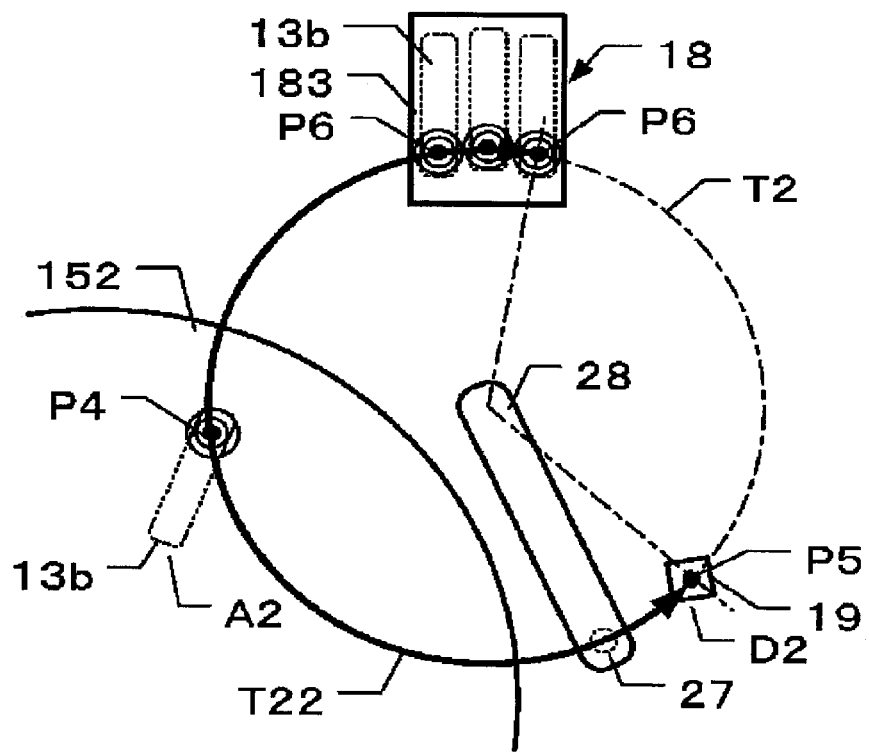
FIG. 8B is a diagram showing an example of a track of the second reagent dispensing probe according to the embodiment.

As shown in FIG. 8B, the second reagent dispensing arm 28 supports the second reagent dispensing probe 27 such that the probe 27 is horizontally movable along the fourth track T22, defining an arc having the sixth upper stop position P6 and the fourth upper position P4 as its ends as a fourth track T22 on the circumference T2 as indicated by the arrow. The sixth upper stop position P6 is above the three second reagent vessels 13b placed at the predetermined positions in the second reagent storage room 18, and is located on an elongation line of the third track T21 on the circumference T2.

Furthermore, as shown in FIG. 8B, the second reagent dispensing arm 28 supports the second reagent dispensing probe 27 in such a manner that the probe can be moved downward from each of the fifth upper stop position P5 and the sixth upper stop position P6.

In FIG. 8B, the fourth track T22 is defined as the major arc on the circumference T2 which includes the third track T21; however, the track may be defined as the minor arc determined by the sixth upper stop position P6 and the fifth upper stop position P5 on the circumference T2, not including the fourth track T22. At this time, the second reagent dispensing arm 28 supports the second reagent dispensing probe 27 in a horizontally movable manner along the track on the minor arc.

Under the control of the analysis controlling circuitry 41, the second reagent dispensing probe 27 dispenses per cycle the second reagent in the second reagent vessel 13b that has been moved to the suction position A2 among the plurality of second reagent vessels 13b held by the second reagent rack 16b. Defining a predetermined position on the third track T21 as a base position, the second reagent dispensing probe 27 is horizontally moved along the third track T21 from the base position, and is stopped at the fourth upper stop position P4. Subsequently, the second reagent dispensing probe 27 is lowered from the fourth upper stop position P4, and is stopped at a position where the liquid level of the second reagent in the second reagent vessel 13b at the suction position A2 is detected by the second reagent detector. After suctioning the second reagent, the second reagent dispensing probe 27 is raised and stopped at the fourth upper stop position P4, and is then horizontally moved along the third track T21 and stopped at the fifth upper stop position P5. Subsequently, after discharging the second reagent into the reaction vessel 19 at the discharge position D2 at the fifth upper stop position P5, the second reagent dispensing probe 27 is horizontally moved to the base position along the third track T21. The second reagent dispensing probe 27 performs one series of the above-described operations in one cycle.

Defining a base position on the fourth track T22 as the base position on the third track T21, the second reagent dispensing probe 27 is horizontally moved from the base position along the fourth track T22 under the control of the analysis controlling circuitry 41. The second reagent dispensing probe 27 is then stopped at the sixth upper stop position P6 above the second reagent vessel 13b, which is at a position where the reagent information is read by the reader 182. Subsequently, the second reagent dispensing probe 27 is lowered from the sixth upper stop position PG, and is stopped at a position where the liquid level of the second reagent in the second reagent vessel 13b is detected by the second reagent detector. After suctioning the second reagent, the second reagent dispensing probe 27 is raised and stopped at the sixth upper stop position P6, and is then horizontally moved along the fourth track T22 and stopped at the fifth upper stop position P5. Subsequently, after discharging the second reagent into the reaction vessel 19 at the discharge position D2 at the fifth upper stop position P5, the second reagent dispensing probe 27 is horizontally moved to the base position along the fourth track T22. The second reagent dispensing probe 27 performs one series of the above-described dispensing operations in one cycle.

The second reagent dispensing probe 27 is controlled to not be lowered to a position at which the second reagent vessel 13b is not placed and is not detected by the detector 181 among the three placeable positions in the second reagent storage room 18.

Since the second reagent storage room 18 is located at a position distant from the third track T21, an operator can place the second reagent vessel 13b in the second reagent storage room 18 without touching or hitting the second reagent dispensing probe 27 and the second reagent dispensing arm 28, while the second reagent dispensing probe 27 is dispensing the second reagent in the second reagent vessel 13b held by the second reagent rack 16b to the reaction vessel 19.

The second reagent vessel 13b can be placed in the second reagent storage room 18 by horizontally pushing the second reagent vessel 13b in the direction of the fourth track T22 from the intake port 18a that is arranged in a further circumferential side than the fourth track T22 and below the second reagent dispensing probe 27 that is moved along the fourth track T22. Thus, it is possible to avoid contact or collision between the second reagent dispensing probe 27 and the second reagent dispensing arm 28 that is moved along the fourth track T22 and the second reagent vessel 13b to be placed in the second reagent storage room 18, or with an operator who holds the second reagent vessel 13b.

If the second reagent vessel 13b is placed at the predetermined position in the second reagent storage room 18 and another second reagent vessel 13b is additionally placed, the second reagent dispensing probe 27 is lowered to the position of the additionally-placed second reagent vessel 13b, only after the second reagent vessel 13b is horizontally pushed in from the intake port 18a to a predetermined position where no second reagent vessel 13b is placed; thereby avoiding contact or collision between the second reagent vessel 13b and the second reagent dispensing probe 27.

An example of the operation of the automatic analyzing apparatus 100 will be explained with reference to FIGS. 1 to 8.

If there is no space in the first reagent rack 16a for holding a first reagent vessel 13a containing a first reagent of a test item B for which a test is less frequently carried out, the first reagent vessel 13a for the test item B is placed at a predetermined position in the first reagent storage room 17. For the same reason as the first reagent vessel 13a, a second reagent vessel 13b containing a second reagent of the test item B is placed at a predetermined position in the second reagent storage room 18.

When input for carrying out calibration for each test item including the test item B is made from the input interface 80, the automatic analyzing apparatus 100 starts a calibration operation. The analysis controlling circuitry 41 rotates each of the first reagent rack 16a in the first reagent depository 14 and the second reagent rack 16b in the second reagent depository 15. The analysis controlling circuitry 41 then causes the reader 141 and the reader 151 to read the reagent information indicated on all of the first reagent vessels 13a held by the first reagent rack 16a and the reagent information indicated on all of the second reagent vessels 13b held by the second reagent rack 16b, respectively.

The analysis controlling circuitry 41 causes the reader 172 and the reader 182 to read the reagent information indicated on the first reagent vessel 13a for the test item B, which is placed at the predetermined position in the first reagent storage room 17 and is detected by the detector 171, and the reagent information indicated on the second reagent vessel 13b for the test item B, which is placed at the predetermined position in the second reagent storage room 18 and detected by the detector 181, respectively. The analysis controlling circuitry 41 then obtains the reagent information of all the first reagent vessels 13a held by the first reagent rack 16a, information of the held positions, the reagent information of all the second reagent vessels 13b held by the second reagent rack 16b, and information of the held positions. In addition, the analysis controlling circuitry 41 obtains the reagent information of all the first reagent vessels 13a placed in the first reagent storage room 17, information of the placed position, the reagent information of all the second reagent vessels 13b placed in the second reagent storage room 18, and information of the placed position.

If the reagent information of any test item for which calibration is performed is missing in the obtained reagent information, the analysis controlling circuitry 41 causes the monitor 72 to display an error message indicating that the first reagent vessel 13a and the second reagent vessel 13b of the test item are not provided in the analysis mechanism 10. In the case of the test item B of the two-reagent system, if the first reagent vessel 13a for the test item B is placed in, for example, the first reagent storage room 17, the second reagent vessel 13b for the test item B is neither held by the second reagent rack 16b nor placed in the second reagent storage room 18, and the analysis controlling circuitry 41 causes the monitor 72 to display an error message indicating that the second reagent vessel 13b for the test item B is not provided in the analysis mechanism 10. If the second reagent vessel 13b for the test item B is placed in the second reagent storage room 18, the first reagent vessel 13a for the test item B is neither held by the first reagent rack 16a nor placed in the first reagent storage room 17, and the analysis controlling circuitry 41 causes the monitor 72 to display an error message indicating that the first reagent vessel 13a for the test item B is not provided in the analysis mechanism 10. Furthermore, if calibration is performed with either one of the first reagent vessel 13a or the second reagent vessel 13b for the test item B not being provided in the analysis mechanism 10, the standard test sample and the reagent for the test item B are not dispensed; therefore, the calibration data of the test item B is not generated.

The analysis controlling circuitry 41 causes respective units to perform, per cycle, cleaning each reaction vessel 19, dispensing each standard test sample, dispensing the first reagent of each test item, stirring a solution mixture of each standard test sample and the first reagent of each test item, dispensing the second reagent of each test item, stirring a solution mixture of each standard test sample, the first reagent, and the second reagent for each test item, and measuring the stirred solution mixture.

When dispensing the first reagent, the first reagent dispensing probe 23 suctions the first reagent of each test item except for the test item B in the first reagent vessel 13a held by the first reagent rack 16a. The first reagent dispensing probe 23 discharges the suctioned first reagent into the reaction vessel 19. The first reagent dispensing probe 23 suctions the first reagent of the test item B in the first reagent vessel 13a placed in the first reagent storage room 17. The first reagent dispensing probe 23 discharges the suctioned first reagent into the reaction vessel 19.

When dispensing the second reagent, the second reagent dispensing probe 27 suctions the second reagent of each test item except for the test item B in the second reagent vessel 13b held by the second reagent rack 16b. The second reagent dispensing probe 27 discharges the suctioned second reagent into the reaction vessel 19 that contains the first reagent which constitutes a pair with this second reagent. The second reagent dispensing probe 27 suctions the second reagent of the test item B in the second reagent vessel 13b placed in the second reagent storage room 18. The second reagent dispensing probe 27 discharges the suctioned second reagent into the reaction vessel 19 which contains the first reagent of the test item B.

As described above, if there is no space for holding a first reagent vessel 13a in a first reagent rack 16a, it is possible to suction and dispense the first reagent of a test item that the first reagent rack 16a is not able to provide by placing the first reagent vessel 13a containing the first reagent in the first reagent storage room 17. If there is no space for holding a second reagent vessel 13b in a second reagent rack 16b, it is possible to suction and dispense a second reagent of a test item that the second reagent rack 16b is not able to provide by placing the second reagent vessel 13b containing the second reagent in the second reagent storage room 18.

By executing the arithmetic function 61, the data processing circuitry 60 generates standard data of each test item of a one-reagent system for which the first reagent is contained in the first reagent vessel 13a held by the first reagent rack 16a. The data processing circuitry 60 generates standard data of each test item of a two-reagent system for which the first reagent is contained in the first reagent vessel 13a held by the first reagent rack 16a and the second reagent is contained in the second reagent vessel 13b held by the second reagent rack 16b. The data processing circuitry 60 generates calibration data of the test item B for which the first reagent vessel 13a is placed in the first reagent storage room 17 and the second reagent vessel 13b is placed in the second reagent storage room 18.

The memory 62 also stores calibration data of each test item generated by the data processing circuitry 60. When the calibration data of all the test items generated by the data processing circuitry 60 is output from the output interface 70 by printing out and displaying, the automatic analyzing apparatus 100 finishes the calibration operation.

The first reagent vessel 13a for the test item B placed in the first reagent storage room 17 and the second reagent vessel 13b for the test item B placed in the second reagent storage room 18 are then removed, and if input for carrying out a test is made from the input interface 80, with the first reagent vessel 13a and the second reagent vessel 13b being not provided in the first reagent storage room 17 and the second reagent storage room 18, the analysis controlling circuitry 41 rotates the first reagent rack 16a and the second reagent rack 16b. The analysis controlling circuitry 41 then causes the reader 141 and the reader 151 to read the reagent information indicated on all of the first reagent vessels 13a held by the first reagent rack 16a and the reagent information indicated on all of the second reagent vessels 13b held by the second reagent rack 16b, respectively.

The analysis controlling circuitry 41 then obtains reagent information of the first reagents in all the first reagent vessels 13a held by the first reagent rack 16a, information of held positions of the first reagent vessels 13a that are identified by the reagent information of the first reagents, reagent information of the second reagents in all the second reagent vessels 13b held by the second reagent rack 16b, and information of held positions of the second reagent vessels 13b that are identified by the reagent information of the second reagents.

Subsequently, the analysis controlling circuitry 41 then causes respective units to perform, per cycle, cleaning each reaction vessel 19, dispensing each object test sample, dispensing the first reagent of each test item in the first reagent vessel 13a held by the first reagent rack 16a, stirring a solution mixture of each object test sample and the first reagent of each test item, dispensing the second reagent of each test item in the second reagent vessel 13b held by the second reagent rack 16b, stirring a solution mixture of each standard test sample, the first reagent, and the second reagent of each test item, and measuring the stirred solution mixture.

When an amount of the first reagent in the first reagent vessel 13a, which is identified by a test item C1, has decreased and reaches a warning amount during the test, the analysis controlling circuitry 41 causes the monitor 72 to display a warning message indicating a shortage of the first reagent of the test item C1. For example, one refill first reagent vessel 13a, which contains a sufficient amount of the first reagent, is horizontally pushed in the direction L1 from the intake port 17a with its side surface where a bar code is indicated facing the front side surface of the analysis mechanism 10, thereby placing the refill vessel in the predetermined position in the first reagent storage room 17.

Since the first reagent storage room 17 is located at a position distant from the first track T11, the first reagent vessel 13a can be placed in the first reagent storage room 17 without touching or hitting the first reagent dispensing probe 23 and the first reagent dispensing arm 24 while the first reagent dispensing probe 23 is dispensing the first reagent in the first reagent vessel 13a held by the first reagent rack 16a to the reaction vessel 19.

If, for example, two first reagent vessels 13a including the refill first reagent vessel 13a are stored in the first reagent depository 14, and an amount of the first reagent in one of the first reagent vessels 13a held by the first reagent rack 16a has decreased below the warning amount, the first reagent in the other first reagent vessel 13a may be dispensed. However, since the first reagent vessels 13a for a number of test items are held in the first reagent rack 16a, there is a limit to the number of the first reagent vessels 13a that the rack can hold. Accordingly, when an amount of the first reagent in the first reagent vessel 13a held by the first reagent rack 16a reaches the warning amount, it is possible to prevent an increase of the size of the first reagent depository 14 by providing a first reagent storage room 17 for placing the refill first reagent vessels 13a therein in accordance with the warning.

The detector 171 detects the first reagent vessel 13a which is placed at a predetermined position. The reader 172 reads reagent information indicated on the first reagent vessel 13a detected by the detector 171. If the reagent information which is read by the reader 172 indicates a test item C1, when an amount of the first reagent of the test item C1 in the first reagent vessel 13a held by the first reagent rack 16a becomes even less than the warning amount, and the first reagent of the test item C1 is dispensed after the amount reaches a suctionable limit, the analysis controlling circuitry 41 dispenses into the reaction vessel 19 the first reagent in the first reagent vessel 13a at the position where the reagent information was read by the detector 172.

According to the present embodiment, there is no need of temporarily stopping the dispensing of the first reagent for each test item, which is performed per cycle, in order to remove the reagent cover 142 and exchange the first reagent vessel 13a even when the first reagent in the first reagent vessel 13a held by the first reagent rack 16a runs short; thus, a degradation of throughput can be avoided and the test can be smoothly carried out.

Furthermore, during the test, while the dispensing of the first reagent and the second reagent for each test item is being performed per cycle, after the calibration, the first reagent vessel 13a for the test item B that has been removed from the first reagent storage room 17 and the second reagent vessel 13b for the test item B which has been removed from the second reagent storage room 18, are respectively placed in the first reagent storage room 17 and the second reagent storage room 18 once again, and the detector 171 and the detector 181 then detect the first reagent vessel 13a in the first reagent storage room 17 and the second reagent vessel 13b in the second reagent storage room 18. The reader 172 and the reader 182 respectively read the reagent information indicated on the detected first reagent vessel 13a and the reagent information indicated on the detected second reagent vessel 13b.

If the reagent information read by the reader 172 and the reader 182 is information related to the test item B, when the first reagent of the test item B that is set for an object test sample is dispensed, the analysis controlling circuitry 41 has the first reagent in the first reagent vessel 13a for the test item B placed in the first reagent storage room 17 dispensed to the reaction vessel 19 to which the sample has been dispensed. When dispensing the second reagent of the test item B, the second reagent in the second reagent vessel 13b for the test item B placed in the second reagent storage room 18 is dispensed to the reaction vessel 19 to which the first reagent of the test item B has been dispensed. The measurement unit 31 generates object data by measuring the solution mixture of the object test sample to which the test item B is set and the first and second reagents of the test item B. The data processing circuitry 60 executes the arithmetic function 61 and generates analysis data of the test item B from the object data generated by the analysis mechanism 10, using the calibration data of the test item B stored in the memory 62 by the calibration.

As described above, the first reagent dispensing probe 23 does not get lowered to a position where no first reagent vessel 13a is placed in the first reagent storage room 17, and does not get lowered to the first reagent vessel 13a until the vessel is placed to a predetermined position; thus, collision between the first reagent dispensing probe 23 and the first reagent storage room 17 can be avoided. Furthermore, since the first reagent vessel 13a can be placed in the first reagent storage room 17 and the second reagent storage room 18, it is possible to carry out a test smoothly and to avoid degradation of throughput, without interrupting the dispensing of the first and second reagents of each test item, which is performed per cycle.

The data processing circuitry 60 generates analysis data of each object test sample for each test item based on the object data generated by the analysis mechanism 10. When all of the analysis data generated by the data processing circuitry 60 is output from the output interface 70 by printing out and displaying, the automatic analyzing apparatus 100 finishes the test operation.

According to the embodiment described above, the first reagent dispensing probe 23 that is horizontally moved along the first track T11 between the first upper stop position P1 above the first reagent vessel 13a that is at the suction position A1 and held by the first reagent rack 16a, and the second upper stop position P2 above the reaction vessel 19 at the discharge position D1, is moved along the second track T12 between the third upper stop position P3 that is above the first reagent vessel 13a placed in the first reagent storage room 17 provided at a position distant from the first track T11, and is on the elongation line of the first track T11 and the second upper stop position P2, thereby placing the first reagent vessel 13a in the first reagent storage room 17 without contacting and colliding with the first reagent dispensing probe 23 and the first reagent dispensing arm 24 when dispensing the first reagent in the first reagent vessel 13a held by the first reagent rack 16a.

The second reagent dispensing probe 27 that is moved along the third track T21 between the fourth upper stop position P4 above the second reagent vessel 13b that is at the suction position A2 and held by the second reagent rack 16b, and the fifth upper stop position P5 above the reaction vessel 19 at the discharge position D2, is moved along the fourth track T22 between the sixth upper stop position P6 that is above the second reagent vessel 13b placed in the second reagent storage room 18 provided at a position distant from the third track T21, and is on the elongation line of the third track T21 and the fifth upper stop position P5, thereby placing the second reagent vessel 13b in the second reagent storage room 18 without contacting and colliding with the second reagent dispensing probe 27 and the second reagent dispensing arm 28 when dispensing the second reagent in the second reagent vessel 13b held by the second reagent rack 16b.

The intake port 17a of the first reagent storage room 17 can be placed further out on a circumferential side than the second track T12 and below the first reagent dispensing probe 23 which is moved along the second track T12 so that the first reagent vessel 13a can be horizontally pushed in the direction of the second track T12 from the intake port 17a, thereby placing the first reagent vessel 13a in the first reagent storage room 17. Thus, it is possible to avoid contact or collision between the first reagent dispensing probe 23 or the first reagent dispensing arm 24 that is moved along the second track T12 and the first reagent vessel 13a to be placed in the first reagent storage room 17, or with an operator who holds the first reagent vessel 13a.

The second reagent vessel 13b can be placed in the second reagent storage room 18 by horizontally pushing the second reagent vessel 13b in the direction of the fourth track T22 from the intake port 18a that is arranged further out on a circumferential side than the fourth track T22 and below the second reagent dispensing probe 27 that is moved along the fourth track T22. Thus, it is possible to avoid contact or collision between the second reagent dispensing probe 27 or the second reagent dispensing arm 28 that is moved along the fourth track T22 and the second reagent vessel 13b to be placed in the second reagent storage room 18, or with an operator who holds the second reagent vessel 13b.

If the first reagent vessel 13a is placed at the predetermined position in the first reagent storage room 17 and another first reagent vessel 13a is additionally placed, the first reagent dispensing probe 23 is lowered to the position of the additionally-placed first reagent vessel 13a, only after the first reagent vessel 13a is horizontally pushed in from the intake port 17a to a predetermined position where no first reagent vessel 13a is placed; thereby avoiding contact or collision between the first reagent vessel 13a and the first reagent dispensing probe 2.

If the second reagent vessel 13b is placed at the predetermined position in the second reagent storage room 18 and another second reagent vessel 13b is additionally placed, the second reagent dispensing probe 27 is lowered to the position of the additionally-placed second reagent vessel 13b, only after the second reagent vessel 13b is horizontally pushed in from the intake port 18a to a predetermined position where no second reagent vessel 13b is placed; thereby avoiding contact or collision between the second reagent vessel 13b and the second reagent dispensing probe 27.

Thus, since a reagent running short can be refilled without interrupting the dispensing of the reagent, it is possible to carry out a test smoothly.

The expression "processor" used in the above explanation means circuitry such as a CPU (Central Processing Unit), GPU (Graphics Processing Unit), Application Specific Integrated Circuit (ASIC), a programmable logic device (for example, Simple Programmable Logic Device (SPLD), Complex Programmable Logic Device (CPLD), and Field Programmable Gate Array (FPGA)), etc. The processor realizes its function by reading and executing the program stored in the storage circuitry. Instead of storing a program on the storage circuitry, the program may be directly integrated into the circuitry of the processor. In this case, the function is realized by reading and executing the program integrated into the circuitry. Each processor of the present embodiment is not limited to a case where each processor is configured as a single circuit; a plurality of independent circuits may be combined into one processor to realize the function of the processor. Furthermore, a plurality of constituent elements shown in FIG. 1 may be integrated into one processor to realize the function.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the invention.

The invention claimed is:

1. An apparatus, comprising:
a reagent depository that stores a first reagent vessel;
a reagent storage unit that is provided separately from the reagent depository and in which a second reagent vessel is placeable;
a probe that (a) suctions, from a first position which is located above the reagent depository, a first reagent contained in the first reagent vessel; (b) suctions, from a second position which is located above the reagent storage unit, a second reagent contained in the second reagent vessel; and (c) discharges the respective first or second reagent suctioned from the first reagent vessel or the second reagent vessel into a reaction vessel at a third position;
a measurement unit that measures a solution mixture of an object test sample and a reagent to generate object data;
a reader that reads reagent information indicated on the second reagent vessel placed in the reagent storage unit; and
analysis controlling circuitry configured to (a) cause the probe to suction a reagent from the second reagent vessel after the reagent information is read by the reader when (1) an amount of a reagent of a test item in the first reagent vessel stored in the reagent depository reaches below a predetermined amount and (2) the second reagent vessel contains a reagent of a test item that is the same as the test item of the first reagent vessel stored in the reagent depository, (b) cause the reader to read the reagent information indicated on the second reagent vessel when the second reagent vessel containing a predetermined reagent is placed once again in the reagent storage unit after being removed therefrom, and (c) cause the measurement unit to measure the solution mixture of the object test sample and the reagent when the reagent in the second reagent vessel from which the reagent information is read by the reader is the predetermined reagent,
wherein
the reagent storage unit includes an intake port arranged below the probe,
the reagent storage unit intakes the second reagent vessel horizontally through the intake port, and
the second reagent vessel is placed in the reagent storage unit.

2. The apparatus according to claim 1, further comprising an arm that supports the probe so that the probe is moved along a first track between the first position and the third position, and a second track between the second position and the third position.

3. The apparatus according to claim 2, wherein the first track and the second track are arc-shaped tracks sharing a same circumference.

4. The apparatus according to claim 1, wherein the reagent storage unit has a cover that covers an upper portion of the second reagent vessel placed in the reagent storage unit, and the cover includes a penetrating hole at a position corresponding to the second position.

5. The apparatus according to claim 1, wherein the reagent depository stores a plurality of first reagent vessels, and the reagent storage unit includes a reader that reads reagent information indicated on the second reagent vessel placed in the reagent storage unit by being horizontally pushed in through the intake port, the analysis controlling circuitry is further configured to cause the probe to suction a reagent in the second reagent vessel when the second reagent vessel containing a reagent different from any of reagents contained in all the first reagent vessels stored in the reagent depository is placed in the reagent storage unit.

6. The apparatus according to claim 1, wherein the second reagent vessels can be placed in the reagent storage unit, the number of the second reagent vessels placed in the reagent storage unit is less than the number of the first reagent vessels that the reagent depository is capable of storing.

7. The apparatus according to claim 1, wherein the reagent includes a first reagent contained in a third reagent vessel, and a second reagent which constitutes a pair with the first reagent contained in the fourth reagent vessel, the apparatus further comprising analysis controlling circuitry configured to generate an error message if either one of the third reagent vessel or the fourth reagent vessel is placed in the reagent storage unit, and another reagent vessel is neither stored in the reagent depository nor placed in the reagent storage unit.

8. The apparatus according to claim 1, wherein the reagent storage unit has a cover that covers an upper portion of the second reagent vessel placed in the reagent storage unit, and wherein the reagent storage unit comprises a placement surface where the second reagent vessel is placeable, a first side surface, a second side surface, a third side surface, and the cover.

* * * * *